(12) United States Patent
He et al.

(10) Patent No.: US 10,505,714 B2
(45) Date of Patent: Dec. 10, 2019

(54) FLOATING POINT COHORT BASED ENCRYPTION

(71) Applicant: EntIT Software LLC, Sunnyvale, CA (US)

(72) Inventors: Cheryl He, Sunnyvale, CA (US); Timothy Roake, Sunnyvale, CA (US); Luther Martin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 328 days.

(21) Appl. No.: 15/693,026

(22) Filed: Aug. 31, 2017

(65) Prior Publication Data

US 2019/0068357 A1 Feb. 28, 2019

(51) Int. Cl.
*H04L 9/06* (2006.01)
*H04L 9/14* (2006.01)

(52) U.S. Cl.
CPC .............. *H04L 9/0618* (2013.01); *H04L 9/14* (2013.01)

(58) Field of Classification Search
CPC ................................ H04L 9/0618; H04L 9/14
See application file for complete search history.

(56) References Cited

U.S. PATENT DOCUMENTS

| | | |
|---|---|---|
| 9,417,842 B2 | 8/2016 | Cilibrasi |
| 9,501,668 B2 | 11/2016 | Chhabra et al. |
| 2004/0174998 A1 | 9/2004 | Youatt et al. |

FOREIGN PATENT DOCUMENTS

WO    WO-03083642    10/2003

OTHER PUBLICATIONS

Agrawal, R. et al., "Order Preserving Encryption for Numeric Data", IBM Almaden Research Center, Jun. 13-18, 2004, Paris, France, pp. 12. https://pdfs.semanticscholar.org/8776/c004a351e23be9ef7a4d214da4fc93260484.pdf.

*Primary Examiner* — Mohammed Waliullah (57) ABSTRACT

In some examples, floating point cohort based encryption may include determining an exponent of a floating point cohort.

20 Claims, 8 Drawing Sheets

| Type | Value | Floating Point Representation | FPE Encrypted (key 3) Floating Point Value | Cohort conversion for key 3 |
|---|---|---|---|---|
| Height | 178.5 cm | 1.78e02 | 2.944e11 | 2944000000000e03 |
| Weight | 73.6 kg | 7.36e01 | 8.01e02 | 0.801e03 |
| Temperature | 36.7 c | 3.67e01 | 4.25e07 | 42500e03 |
| BMI | 23.9 | 2.39e01 | 5.49e-04 | 0.00000549e03 |

FLOATING POINT COHORT BASED ENCRYPTION

BACKGROUND

Encryption may be described as the process of encoding or altering information so as to limit access to the information to an authorized entity. If an unauthorized entity ascertains the encrypted information, absent a key that is used to decrypt the encrypted information, the encrypted information may be unintelligible to the unauthorized entity. The encrypted information may be referred to as ciphertext. The key may be generated by a process that generates pseudo-random encryption keys.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Floating point cohort based encryption apparatuses, methods for floating point cohort based encryption, and non-transitory computer readable media having stored thereon machine readable instructions to provide floating point cohort based encryption are disclosed herein. The apparatuses, methods, and non-transitory computer readable media disclosed herein provide for the storage of a key version for a key that is used to encrypt a floating point number within the floating point number itself. With respect to format preserving encryption (FPE) that can be used to encrypt a floating point number, the storage of the key version within the floating point number itself eliminates the need for an external storage to separately store the key version. Thus, by storage of the key version within the floating point number itself, storage systems need not be modified in that the need for a secondary storage source for the key version is eliminated.

Format preserving encryption may be used to encrypt floating point numbers while maintaining the underlying format. An example of a format preserving encryption applied to the floating point number 1.23e02 may result in the encrypted floating point number 9.46e00. In this case, the particular format preserving encryption format chosen encrypts both the mantissa (e.g., 1.23) and the exponent (e.g., e02) of the floating point number. The encrypted floating point number may be decrypted to obtain the original floating point number. The encrypted floating point number maintains the floating point format. The encrypted floating point number may be stored in datastores or databases without the need for schema changes as would be needed with other non-format-preserving encryption techniques.

The encrypt/decrypt operation may use a key value, and the key value is to be stored securely as it may represent the fundamental secret permitting encryption/decryption operations. A system may rotate through different keys from a key set so that if any one key is compromised, the effect of the compromised key may be limited to those values encrypted with the compromised key. Such a system may need a key version for a key used for each encrypted value to be stored in some way to permit future decryption.

For example, the key version to encrypt the floating point number 1.23e02 may be three (e.g., the third key in a set), and the associated key may encrypt the floating point number to 9.46e00. In this case the encrypted floating point number, as well as the key version, would need to be stored in a same database, or in different databases. The need to store the key version presents technical challenges with respect to maintaining datastore/database schema (which is a feature of FPE).

In order to address at least these technical challenges associated with storage of a key version associated with a key for encryption/decryption of a floating point number, the apparatuses, methods, and non-transitory computer readable media disclosed herein provide for ascertaining a floating point number that is to be encrypted, and ascertaining a key, including a key version, that is to be used to apply format preserving encryption to encrypt the floating point number. Once the floating point number is encrypted based on the ascertained key, a floating point cohort of the encrypted floating point number may be determine based on the key version. Further, a mantissa and exponent of the determined floating point cohort may be identified. The exponent of the determined floating point cohort may be stored as the key version. Thus, by storage of the key version within the floating point number itself (e.g., the exponent of the determined floating point cohort), key version security is increased in that the need for a secondary storage source for the key version is eliminated.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
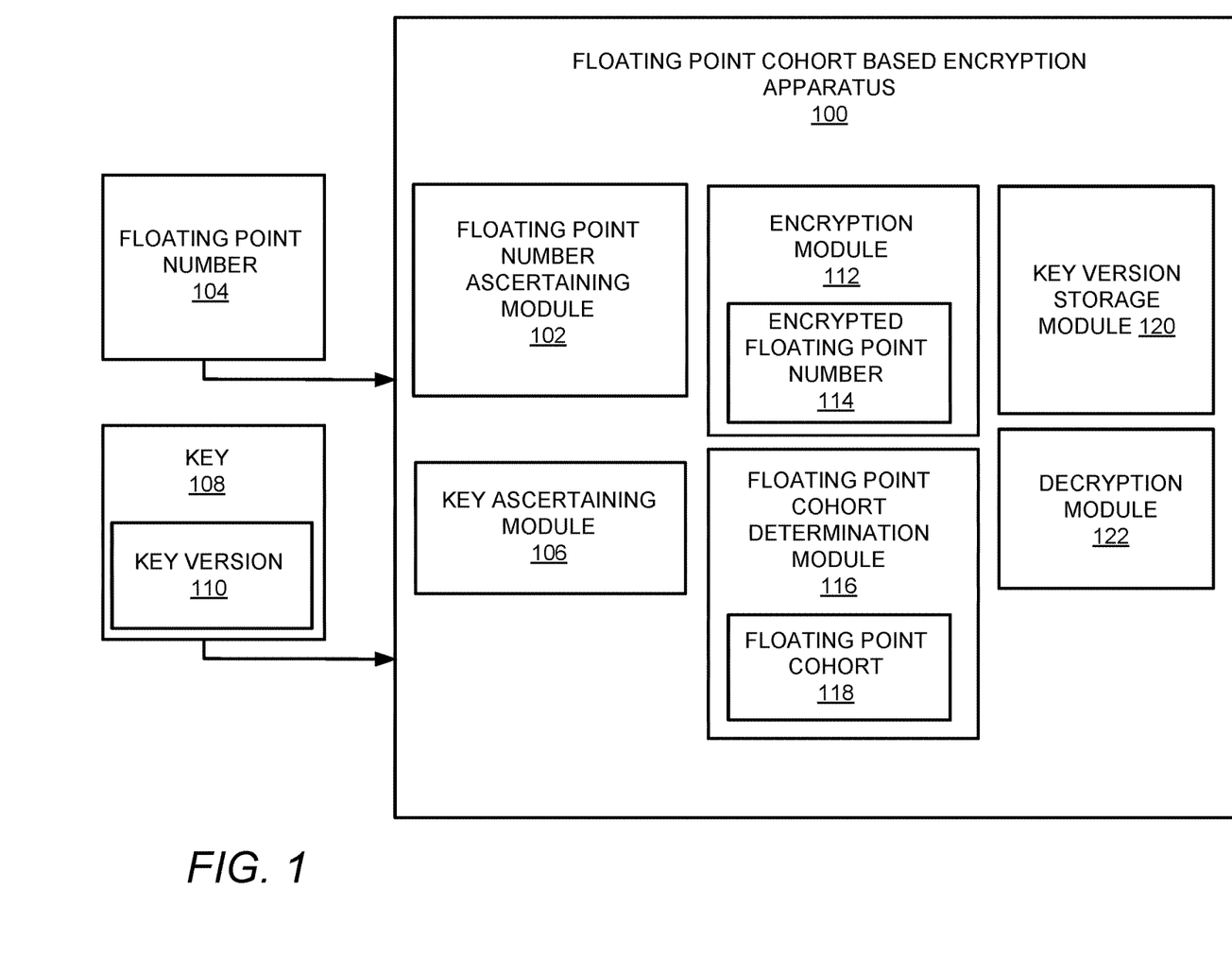
FIG. 1 illustrates an example layout of a floating point cohort based encryption apparatus.

FIG. 1 illustrates an example layout of a floating point cohort based encryption apparatus (hereinafter also referred to as "apparatus 100").

Referring to FIG. 1, the apparatus 100 may include a floating point number ascertaining module 102 to ascertain a floating point number 104 that is to be encrypted.

A key ascertaining module 106 is to ascertain a key 108, including a key version 110, that is to be used to apply format preserving encryption to encrypt the floating point number 104.

An encryption module 112 is to encrypt the floating point number 104 based on the ascertained key 108 (e.g., to generate an encrypted floating point number 114).

A floating point cohort determination module 116 is to determine, based on the key version 110, a floating point cohort 118 of the encrypted floating point number 114. The floating point cohort determination module 116 is to determine a mantissa and exponent of the determined floating point cohort 118.

According to an example, the floating point cohort determination module 116 is to determine, based on the key version 110, the floating point cohort 118 of the encrypted floating point number 114 by shifting a number of decimal points of the encrypted floating point number 114 by a number equal to the key version 110.

A key version storage module 120 is to store (e.g., in a database) the exponent of the determined floating point cohort 118 as the key version 110.

In order to decrypt the encrypted floating point number 114, a decryption module 122 is to ascertain the mantissa of the floating point cohort 118. The decryption module 122 is to ascertain the stored exponent of the floating point cohort 118. The decryption module 122 is to further determine, based on the ascertained mantissa and exponent, the floating point cohort 118 of the encrypted floating point number 114. The decryption module 122 is to determine, based on the further determined floating point cohort 118, the encrypted floating point number 114. For example, the decryption module 122 is to determine, based on the further determined floating point cohort 118, the encrypted floating point number 114 by converting the further determined floating point cohort 118 to a base cohort. The decryption module 122 is to determine, based on the ascertained exponent, the key version 110 of the key 108. The decryption module 122 is to further ascertain the key 108 based on the determined key version 110. Further, the decryption module 122 is to decrypt, based on the further ascertained key 108, the determined encrypted floating point number 114 (e.g., to generate the floating point number 104).

According to an example, the decryption module 122 is to determine, based on the further determined floating point cohort 118, the encrypted floating point number 114 by converting the further determined floating point cohort 118 to a base cohort.

Figure 2:
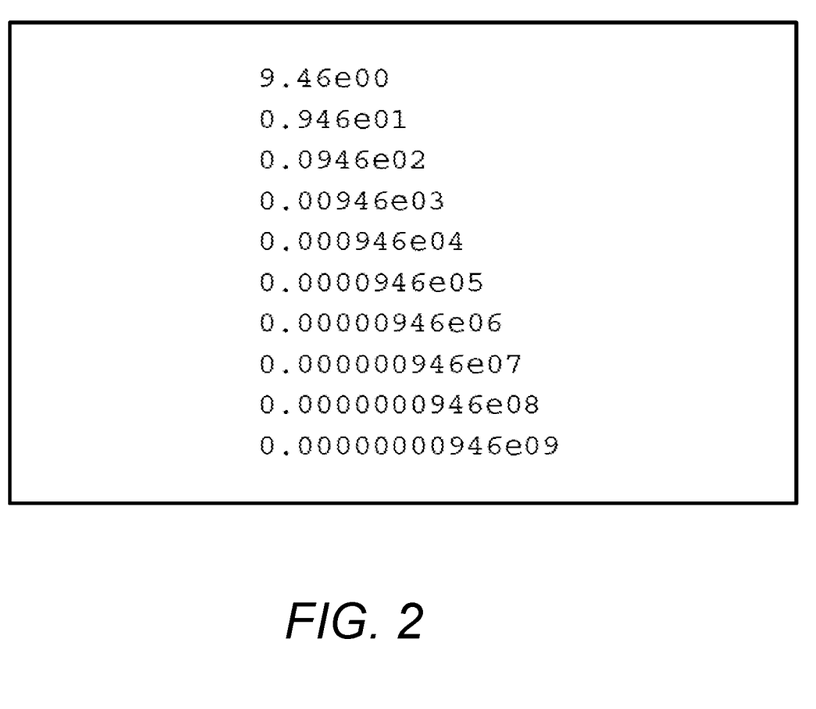
FIG. 2 illustrates various representations of a floating point number to illustrate operation of the floating point cohort based encryption apparatus of FIG. 1.

FIG. 2 illustrates various representations of a floating point number to illustrate operation of the apparatus 100.

Referring to FIG. 2, the same floating point number may be represented in different ways using modified mantissa and exponent values. For the example of the encrypted number 9.46e00, this encrypted number may be represented in the different ways as shown in FIG. 2 using a 32 bit floating point format.

The representations of FIG. 2 of the same value may be denoted as floating point cohorts. The floating point cohorts show that there may be available redundancy within the floating point format definition, and this redundancy may be used as disclosed herein to represent the key version 110 used in the encrypt operation.

In the list of cohorts shown in FIG. 2, the exponent may represent the key version 110. Thus, an encryption operation may be performed by the encryption module 112 by encrypting the floating point number 104 (e.g., 1.23e02) by applying format preserving encryption. In this regard, assuming that the key 108 includes the key version 110 of 3 (e.g., key 3), the encrypted floating point number 114 may be 9.46e00. Referring to FIG. 2, the encrypted floating point number 114 of 9.46e00 when converted to key 3 cohort is 0.00946e03.

Thus, the value stored (e.g., in a database) may include a floating point value with a mantissa of 0.00946 and an exponent of 03.

For the example of FIG. 2, in order to decrypt the encrypted floating point number 114 (e.g., 9.46e00), the decryption module 122 may ascertain the mantissa (e.g., 0.00946) of the floating point cohort 118 (e.g., 0.00946e03). The decryption module 122 is to ascertain the stored exponent (e.g., 03) of the floating point cohort 118. The decryption module 122 is to further determine, based on the ascertained mantissa and exponent, the floating point cohort 118 (e.g., 0.00946e03) of the encrypted floating point number 114. The decryption module 122 is to determine, based on the further determined floating point cohort 118, the encrypted floating point number 114 (e.g., 9.46e00). For example, the decryption module 122 is to determine, based on the further determined floating point cohort 118, the encrypted floating point number 114 by converting the further determined floating point cohort 118 to a base cohort (e.g., converting from 0.00946e03 to 9.46e00). The decryption module 122 is to determine, based on the ascertained exponent, the key version 110 (e.g., key 3) of the key 108. The decryption module 122 is to further ascertain the key 108 based on the determined key version 110. Further, the decryption module 122 is to decrypt, based on the further ascertained key 108, the determined encrypted floating point number 114 (e.g., to generate the floating point number 104 of 1.23e02).

With respect to the floating point cohort 118, the number of cohorts may be determined based on the size of the mantissa, and the cohorts may include both positive and negative exponents. The selection of a base exponent representing the first key version may be arbitrary. Similarly the selection of other exponent values that represent other keys in a set may also be arbitrary, as long as the selection and conversion techniques of cohort exponent to key are consistent in both encrypt and decrypt operations.

Figure 3A:
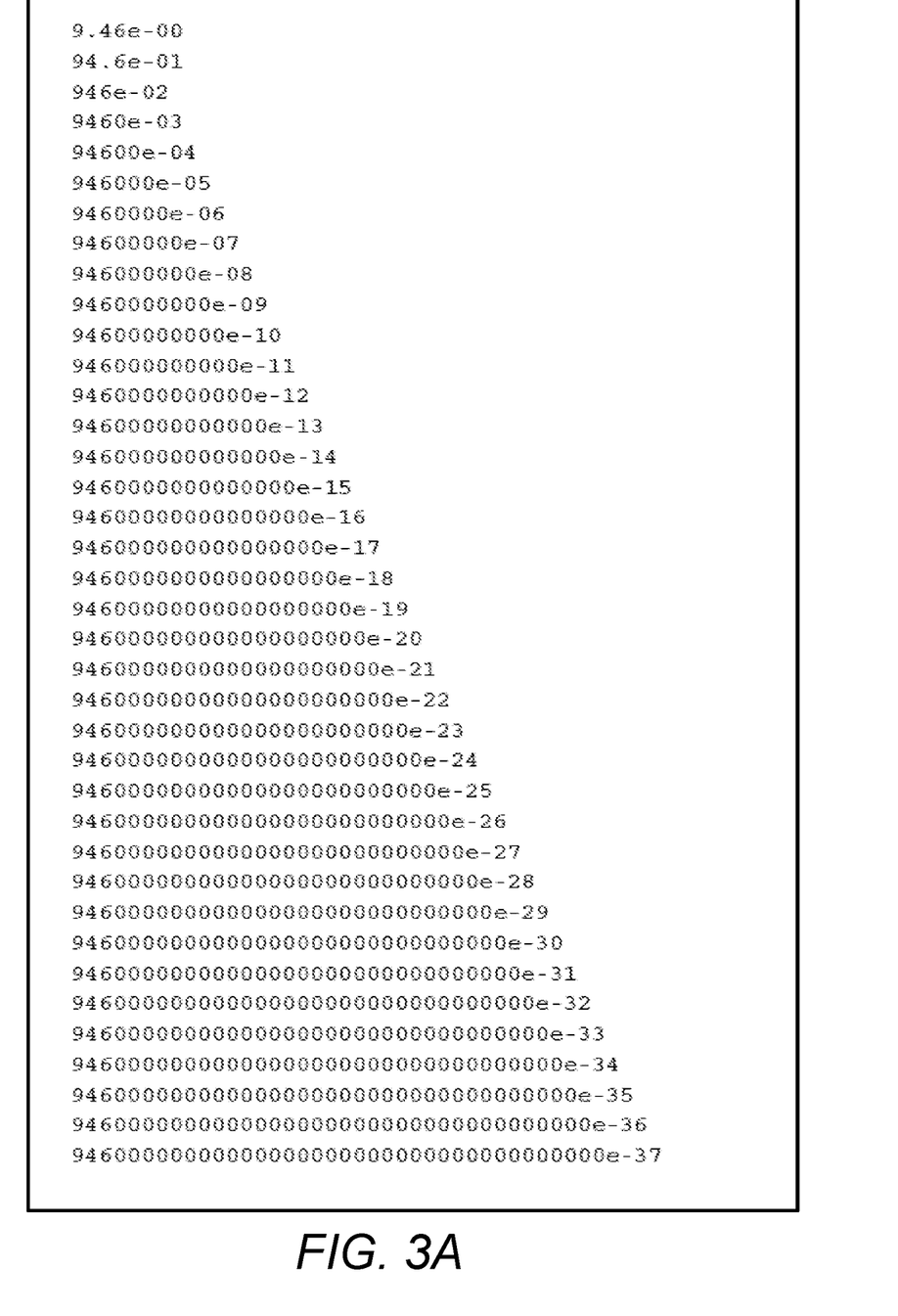
FIGS. 3A and 3B illustrate examples of cohorts of a floating point number to illustrate operation of the floating point cohort based encryption apparatus of FIG. 1.
Figure 3B:
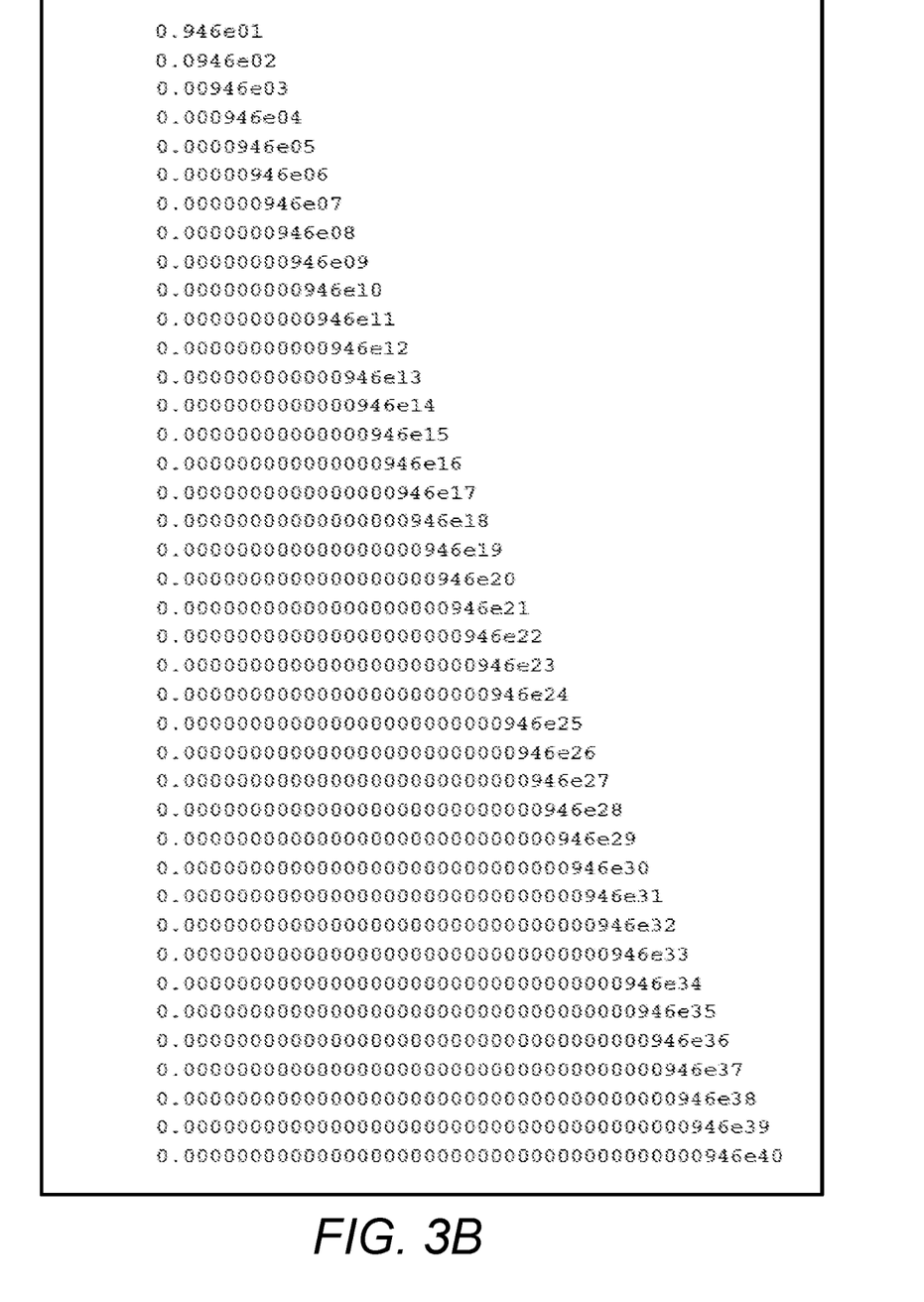

FIGS. 3A and 3B illustrate examples of cohorts of a floating point number to illustrate operation of the apparatus 100.

Referring to FIGS. 3A and 3B, for the mantissa 9.46, the number of floating point cohort 118 may be eighty. For each additional precision digit, two possible cohorts may be removed from the set of available floating point cohorts. For example, 9.468 would include seventy-eight cohorts.

The example of FIGS. 3A and 3B represent quadruple precision floating point numbers (e.g., 128 bit). If double precision is used (e.g., 64 bit), then approximately 17 digits for the fraction part are available, and for 32 bit floating point numbers, 7 digits are available for the fractional part.

Figure 4:
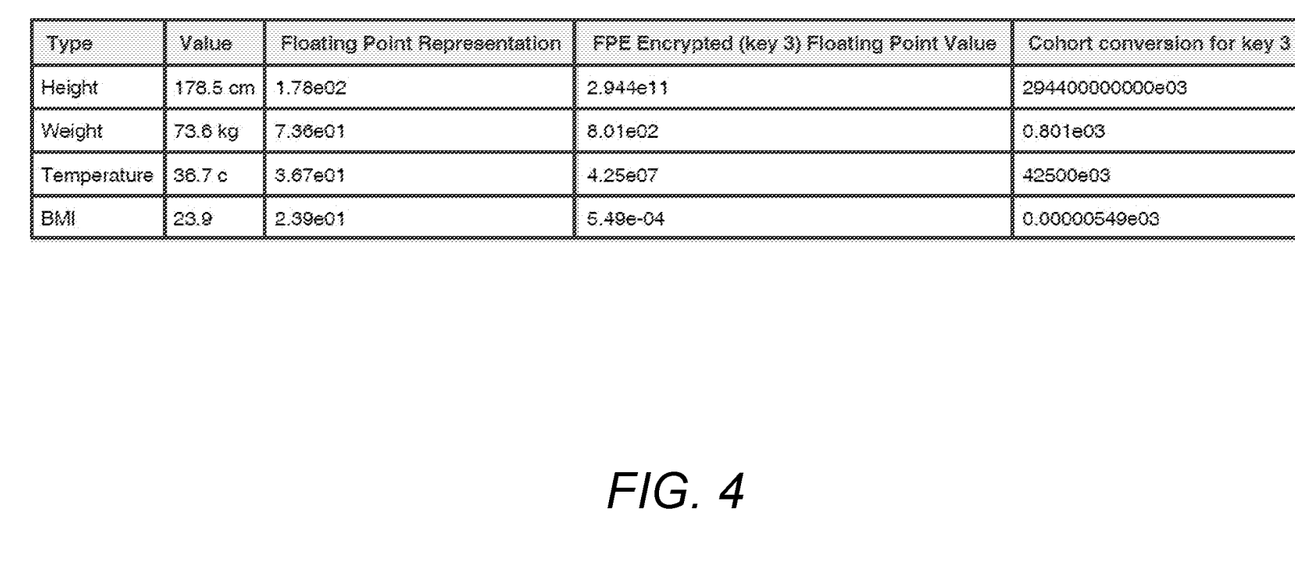
FIG. 4 illustrates examples of encryption to illustrate operation of the floating point cohort based encryption apparatus of FIG. 1.

FIG. 4 illustrates examples of encryption to illustrate operation of the apparatus 100.

The encryption and decryption techniques disclosed herein with respect to the apparatus 100 may be applied to a variety of areas where data may be represented by floating point values. For example, as shown in FIG. 4, data related to height, weight, temperature, body mass index (BMI), etc., may be encrypted as disclosed herein. Further, the type of data illustrated in FIG. 4 may be encrypted as disclosed herein to various values (e.g., with 3 or 4 significant digits), to thus include a relatively large number of floating point cohorts.

Figure 5:
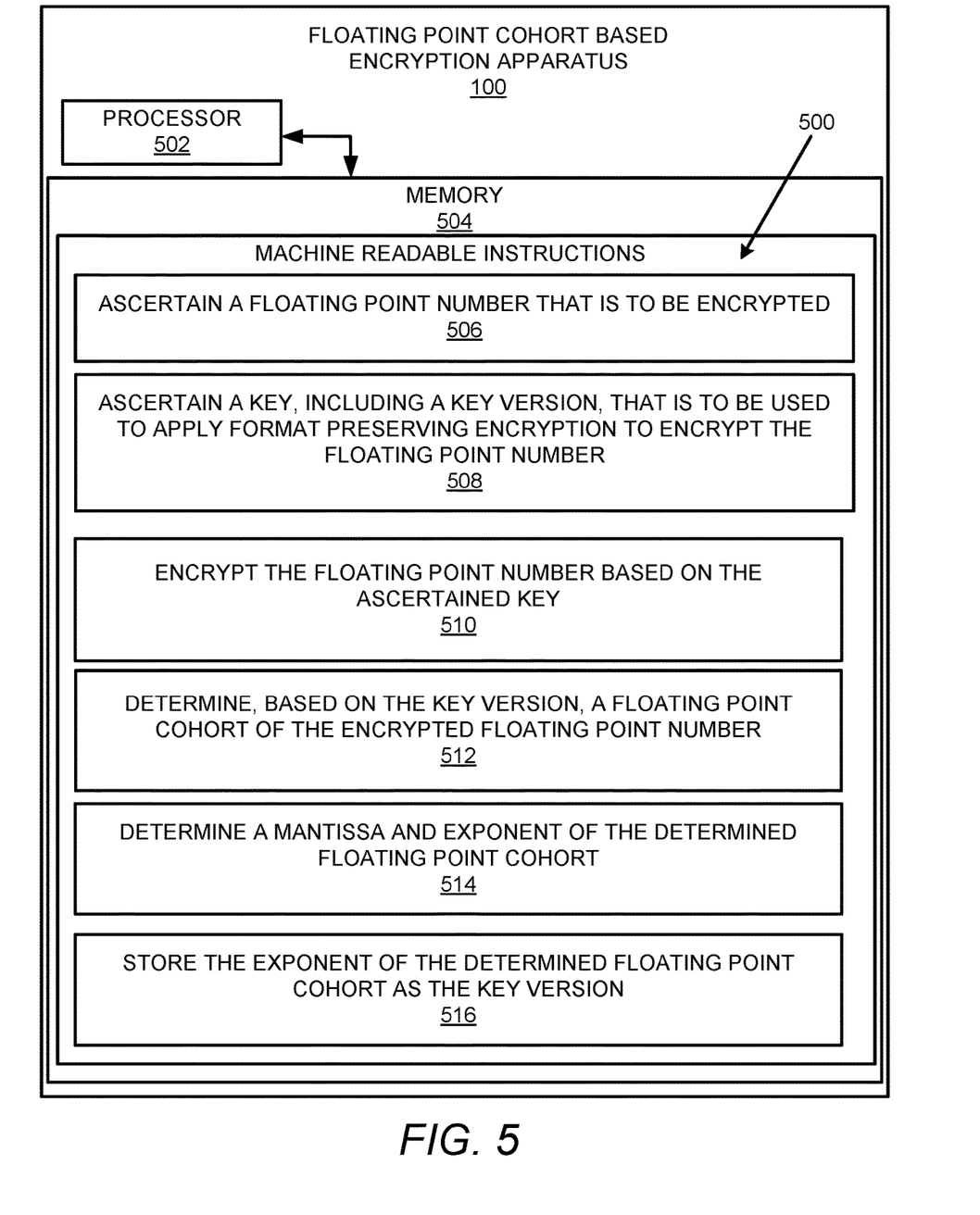
FIG. 5 illustrates an example block diagram for floating point cohort based encryption.
Figure 6:
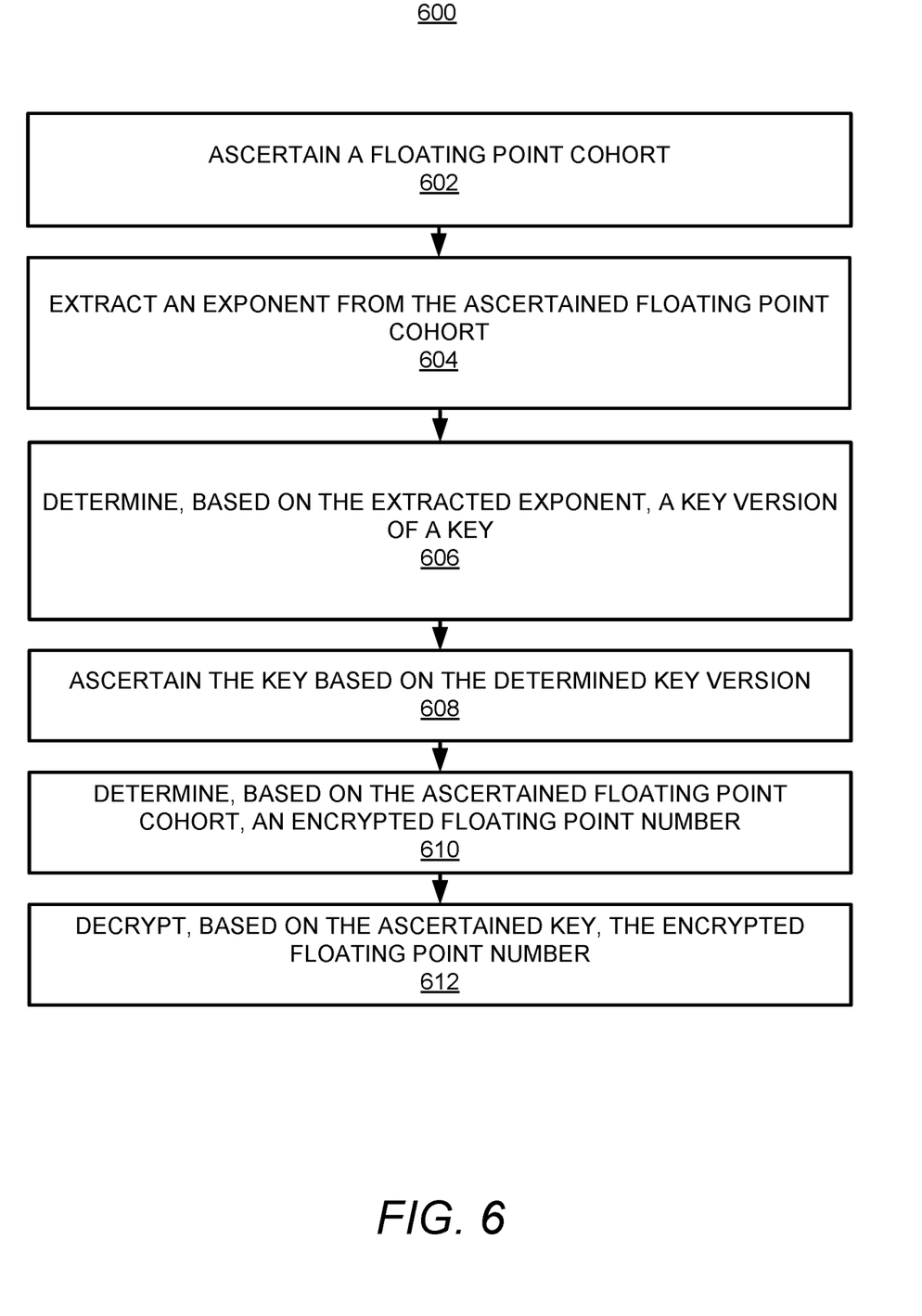
FIG. 6 illustrates an example flowchart of a method for floating point cohort based encryption.
Figure 7:
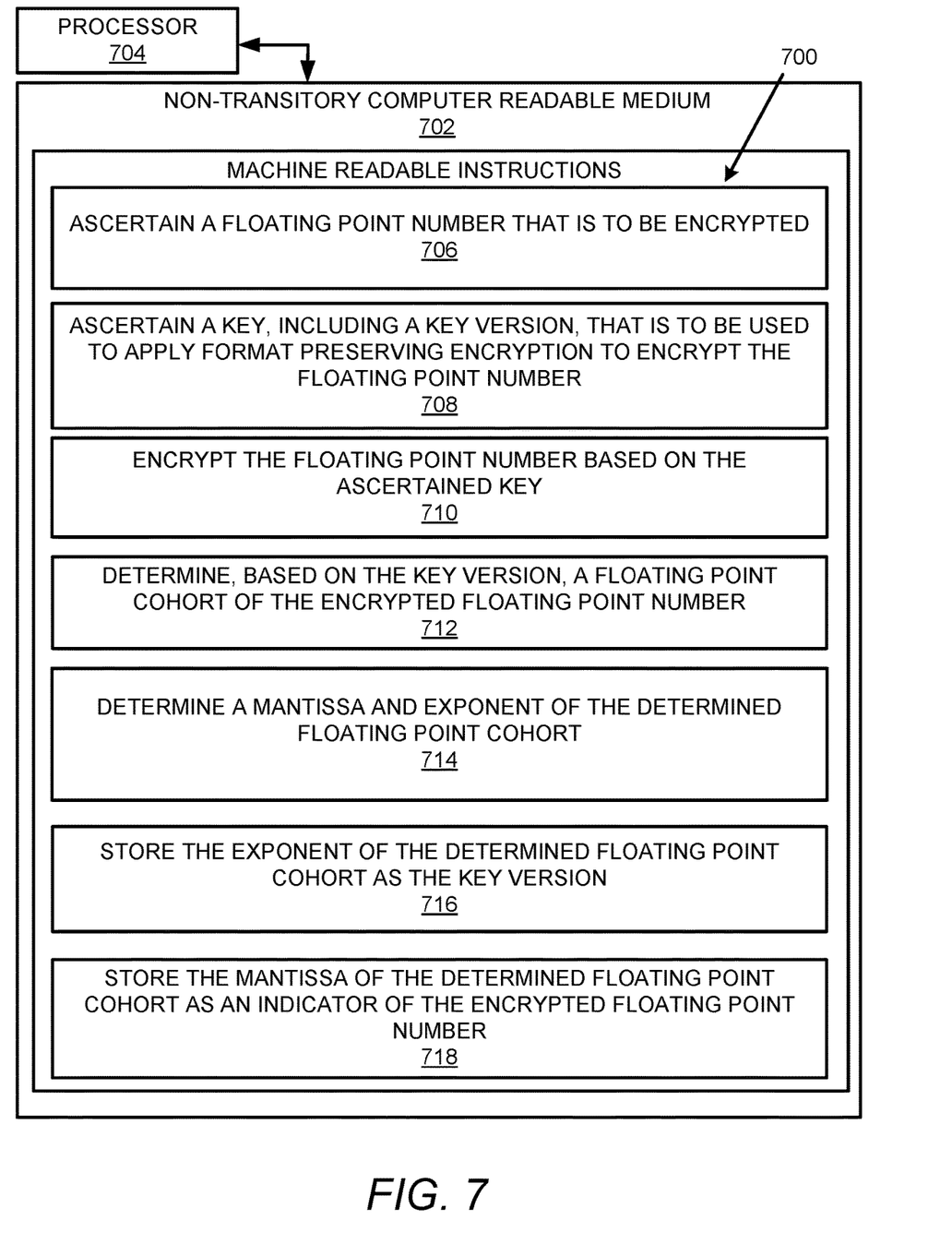
FIG. 7 illustrates a further example block diagram for floating point cohort based encryption.

FIGS. 5-7 respectively illustrate an example block diagram 500, an example flowchart of a method 600, and a further example block diagram 700 for floating point cohort based encryption. The block diagram 500, the method 600, and the block diagram 700 may be implemented on the apparatus 100 described above with reference to FIG. 1 by way of example and not limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 (i.e., a non-transitory computer readable medium) storing machine readable instructions that when executed by the processor cause the processor to perform the instructions of the block diagram 500. The memory 504 may represent a non-transitory computer readable medium. FIG. 6 may represent a method for floating point cohort based encryption, and the steps of the method. FIG. 7 may represent a non-transitory computer readable medium 702 having stored thereon machine readable instructions to provide floating point cohort based encryption. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to ascertain a floating point number 104 that is to be encrypted.

The processor 502 may fetch, decode, and execute the instructions 508 to ascertain a key 108, including a key version 110, that is to be used to apply format preserving encryption to encrypt the floating point number 104.

The processor 502 may fetch, decode, and execute the instructions 510 to encrypt the floating point number 104 based on the ascertained key 108.

The processor 502 may fetch, decode, and execute the instructions 512 to determine, based on the key version 110, a floating point cohort 118 of the encrypted floating point number 114.

The processor 502 may fetch, decode, and execute the instructions 514 to determine a mantissa and exponent of the determined floating point cohort 118.

The processor 502 may fetch, decode, and execute the instructions 516 to store the exponent of the determined floating point cohort 118 as the key version 110.

Referring to FIGS. 1-4 and 6, and particularly FIG. 6, for the method 600, at block 602, the method may include ascertaining a floating point cohort 118.

At block 604 the method may include extracting an exponent from the ascertained floating point cohort 118.

At block 606 the method may include determining, based on the extracted exponent, a key version 110 of a key 108.

At block 608 the method may include ascertaining the key 108 based on the determined key version 110.

At block 610 the method may include determining, based on the ascertained floating point cohort 118, an encrypted floating point number 114.

At block 612 the method may include decrypting, based on the ascertained key 108, the encrypted floating point number 114.

Referring to FIGS. 1-4 and 7, and particularly FIG. 7, for the block diagram 700, the non-transitory computer readable medium 702 may include instructions 706 to ascertain a floating point number 104 that is to be encrypted.

The processor 704 may fetch, decode, and execute the instructions 708 to ascertain a key 108, including a key version 110, that is to be used to apply format preserving encryption to encrypt the floating point number 104.

The processor 704 may fetch, decode, and execute the instructions 710 to encrypt the floating point number 104 based on the ascertained key 108.

The processor 704 may fetch, decode, and execute the instructions 712 to determine, based on the key version 110, a floating point cohort 118 of the encrypted floating point number 114.

The processor 704 may fetch, decode, and execute the instructions 714 to determine a mantissa and exponent of the determined floating point cohort 118.

The processor 704 may fetch, decode, and execute the instructions 716 to store the exponent of the determined floating point cohort 118 as the key version 110.

The processor 704 may fetch, decode, and execute the instructions 718 to store the mantissa of the determined floating point cohort 118 as an indicator of the encrypted floating point number 114.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
    a processor; and
    a non-transitory computer readable medium storing machine readable instructions that when executed by the processor cause the processor to:
        ascertain a floating point number that is to be encrypted;

ascertain a key, including a key version, that is to be used to apply format preserving encryption to encrypt the floating point number;
encrypt the floating point number based on the ascertained key;
determine, based on the key version, a floating point cohort of the encrypted floating point number;
determine a mantissa and exponent of the determined floating point cohort; and
store the exponent of the determined floating point cohort as the key version.

2. The apparatus according to claim 1, wherein the instructions are further to cause the processor to:
ascertain the mantissa of the floating point cohort;
ascertain the stored exponent of the floating point cohort;
further determine, based on the ascertained mantissa and exponent, the floating point cohort of the encrypted floating point number;
determine, based on the further determined floating point cohort, the encrypted floating point number;
determine, based on the ascertained exponent, the key version of the key; and
further ascertain the key based on the determined key version.

3. The apparatus according to claim 2, wherein the instructions are further to cause the processor to:
decrypt, based on the further ascertained key, the determined encrypted floating point number.

4. The apparatus according to claim 2, wherein the instructions are further to cause the processor to:
determine, based on the further determined floating point cohort, the encrypted floating point number by converting the further determined floating point cohort to a base cohort.

5. The apparatus according to claim 1, wherein the instructions are further to cause the processor to:
determine, based on the key version, the floating point cohort of the encrypted floating point number by shifting a number of decimal points of the encrypted floating point number by a number equal to the key version.

6. The apparatus according to claim 1, wherein the instructions are further to cause the processor to:
ascertain the floating point cohort;
extract the stored exponent from the ascertained floating point cohort;
determine, based on the ascertained floating point cohort, the encrypted floating point number;
determine, based on the extracted exponent, the key version of the key; and
further ascertain the key based on the determined key version.

7. The apparatus according to claim 6, wherein the instructions are further to cause the processor to:
decrypt, based on the further ascertained key, the determined encrypted floating point number.

8. The apparatus according to claim 6, wherein the instructions are further to cause the processor to:
determine, based on the ascertained floating point cohort, the encrypted floating point number by converting the ascertained floating point cohort to a base cohort.

9. A method comprising:
ascertaining a floating point cohort;
extracting an exponent from the ascertained floating point cohort;
determining, based on the extracted exponent, a key version of a key;
ascertaining the key based on the determined key version;
determining, based on the ascertained floating point cohort, an encrypted floating point number; and
decrypting, based on the ascertained key, the encrypted floating point number.

10. The method according to claim 9, further comprising:
extracting a mantissa from the ascertained floating point cohort; and
determining, based on the extracted mantissa and exponent, the encrypted floating point number.

11. The method according to claim 9, further comprising:
determining, based on the ascertained floating point cohort, the encrypted floating point number by converting the floating point cohort to a base cohort.

12. The method according to claim 11, further comprising:
converting the floating point cohort to the base cohort by shifting a number of decimal points of the floating point cohort by a number equal to the extracted exponent.

13. The method according to claim 9, wherein the encrypted floating point number is encrypted based on format preserving encryption.

14. A non-transitory computer readable medium having stored thereon machine readable instructions, the machine readable instructions, when executed, cause a processor to:
ascertain a floating point number that is to be encrypted;
ascertain a key, including a key version, that is to be used to apply format preserving encryption to encrypt the floating point number;
encrypt the floating point number based on the ascertained key;
determine, based on the key version, a floating point cohort of the encrypted floating point number;
determine a mantissa and exponent of the determined floating point cohort;
store the exponent of the determined floating point cohort as the key version; and
store the mantissa of the determined floating point cohort as an indicator of the encrypted floating point number.

15. The non-transitory computer readable medium according to claim 14, wherein the machine readable instructions, when executed, further cause the processor to:
ascertain the stored mantissa of the floating point cohort;
ascertain the stored exponent of the floating point cohort;
further determine, based on the ascertained mantissa and exponent, the floating point cohort of the encrypted floating point number;
determine, based on the further determined floating point cohort, the encrypted floating point number;
determine, based on the ascertained exponent, the key version of the key; and
further ascertain the key based on the determined key version.

16. The non-transitory computer readable medium according to claim 15, wherein the machine readable instructions, when executed, further cause the processor to:
decrypt, based on the further ascertained key, the determined encrypted floating point number.

17. The non-transitory computer readable medium according to claim 15, wherein the machine readable instructions, when executed, further cause the processor to:
determine, based on the further determined floating point cohort, the encrypted floating point number by converting the further determined floating point cohort to a base cohort.

18. The non-transitory computer readable medium according to claim 14, wherein the machine readable instructions, when executed, further cause the processor to:
- determine, based on the key version, the floating point cohort of the encrypted floating point number by shifting a number of decimal points of the encrypted floating point number by a number equal to the key version.

19. The non-transitory computer readable medium according to claim 14, wherein the machine readable instructions, when executed, further cause the processor to:
- ascertain the floating point cohort;
- extract the stored exponent from the ascertained floating point cohort;
- determine, based on the ascertained floating point cohort, the encrypted floating point number;
- determine, based on the extracted exponent, the key version of the key; and
- further ascertain the key based on the determined key version.

20. The non-transitory computer readable medium according to claim 19, wherein the machine readable instructions, when executed, further cause the processor to:
- decrypt, based on the further ascertained key, the determined encrypted floating point number.

\* \* \* \* \*